(12) United States Patent
Jung et al.

(10) Patent No.: US 7,884,723 B2
(45) Date of Patent: Feb. 8, 2011

(54) LOWER POWER BATTERY-ASSISTED RFID TAG HAVING IMPROVED RECOGNITION DISTANCE, AND WAKE-UP METHOD THEREOF

(75) Inventors: Jae-Young Jung, Daejeon (KR); Hae Won Son, Daejeon (KR); Jong Hyun Seo, Daejeon (KR); Junho Yeo, Daejeon (KR); Gil Young Choi, Daejeon (KR); Nae Soo Kim, Daejeon (KR); Cheol Sig Pyo, Daejeon (KR); Jong Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 216 days.

(21) Appl. No.: 11/928,288

(22) Filed: Oct. 30, 2007

(65) Prior Publication Data

US 2008/0122625 A1 May 29, 2008

(30) Foreign Application Priority Data

Nov. 28, 2006 (KR) ...................... 10-2006-0118570

(51) Int. Cl.
*G08B 13/14* (2006.01)
(52) U.S. Cl. .................. 340/572.4; 340/571; 340/572.1; 340/572.2; 340/10.3; 455/11.1; 455/16; 455/73
(58) Field of Classification Search ............. 340/572.1, 340/10.33, 10.1, 572.4, 572.8; 455/11.1, 455/16
See application file for complete search history.

(56) References Cited

U.S. PATENT DOCUMENTS

| | | | | |
|---|---|---|---|---|
| 5,245,346 A | * | 9/1993 | Nishimura et al. ............. | 342/42 |
| 5,502,445 A | * | 3/1996 | Dingwall et al. .............. | 342/51 |
| 5,621,412 A | * | 4/1997 | Sharpe et al. ............. | 340/10.33 |
| 5,790,946 A | * | 8/1998 | Rotzoll ..................... | 455/343.1 |
| 6,202,927 B1 | * | 3/2001 | Bashan et al. ................ | 235/451 |
| 6,593,845 B1 | * | 7/2003 | Friedman et al. ......... | 340/10.33 |

(Continued)

FOREIGN PATENT DOCUMENTS

JP 2003-115033 4/2003

(Continued)

OTHER PUBLICATIONS

Notice of Korean Patent Grant dated Dec. 21, 2007 for the corresponding KR 10-2006-0118570.

*Primary Examiner*—Daniel Wu
*Assistant Examiner*—Son M Tang
(74) *Attorney, Agent, or Firm*—Ladas & Parry LLP

(57) ABSTRACT

Provided are a radio frequency identification (RFID) tag and a wake-up method thereof. The RFID tag includes: a power source that supplies a driving voltage; a continuous wave detector that receives the driving voltage from the power supply so as to detect a continuous wave in a signal received from an RFID tag reader; a command detector that selectively receives the driving voltage and detects a command in the signal; and a controller that executes the command detected by the command detector by supplying the driving voltage to the command detector if the continuous wave is detected, and stops the driving voltage from being supplied to the command detector if no command is received from the command detector for a predetermined time period.

20 Claims, 6 Drawing Sheets

U.S. PATENT DOCUMENTS

| | | | |
|---|---|---|---|
| 6,784,813 B2 * | 8/2004 | Shanks et al. | 341/53 |
| 7,142,838 B2 * | 11/2006 | Rotzoll | 455/343.2 |
| 7,394,382 B2 * | 7/2008 | Nitzan et al. | 340/572.8 |
| 2003/0162496 A1 * | 8/2003 | Liu | 455/11.1 |
| 2004/0077383 A1 | 4/2004 | Lappetelainen et al. | |
| 2005/0020321 A1 | 1/2005 | Rotzoll | |

FOREIGN PATENT DOCUMENTS

| | | |
|---|---|---|
| JP | 2004-064328 | 2/2004 |
| KR | 1020060019007 | 3/2006 |
| KR | 1020060022975 | 3/2006 |

* cited by examiner

LOWER POWER BATTERY-ASSISTED RFID TAG HAVING IMPROVED RECOGNITION DISTANCE, AND WAKE-UP METHOD THEREOF

CROSS-REFERENCE TO RELATED PATENT APPLICATION

This application claims the benefit of Korean Patent Application No. 10-2006-0118570, filed on Nov. 28, 2006, in the Korean Intellectual Property Office, the disclosure of which is incorporated herein in its entirety by reference.

BACKGROUND OF THE INVENTION

1. Field of the Invention

The present invention relates to a radio frequency identification (RFID) tag, and more particularly, to a battery-assisted tag driven by an internal power source for improved recognition distance, and a wake-up method thereof.

This work was supported by the IT R&D program of MIC/IITA. [2005-S-106-02, Development of Sensor Tag and Sensor Node Technologies for RFID/USN]

2. Description of the Related Art

Generally, in a radio frequency identification (RFID) technique, tags are attached to respective objects, and unique identifications (IDs) of the objects are wirelessly recognized so that corresponding information can be collected, stored, processed, and traced in order to provide a service in association with the locations of the objects, remote processing, management, and information exchange between the objects. As a replacement of conventional barcodes, the technique is applied to various fields from material management and distribution to security. Therefore, it is expected to create a new market.

RFID systems are either battery-assisted or passive, according to how the tags are powered.

FIG. 1 is a functional block diagram of a conventional passive RFID tag.

When a signal of a continuous wave is received from an RFID reader through an antenna 110, a voltage booster 120 increases the voltage of the signal and supplies it to an electrically erasable programmable read-only memory (EEPROM) 130 and a controller 150 as a driving voltage.

A demodulator 140 demodulates a command of the RFID tag reader received through the antenna 110, and the controller 150 executes the command. Then, the result of executing the command is modulated by a modulator 160 and is transmitted through the antenna 110 to the RFID tag reader.

Accordingly, the passive tag is not assisted by a battery, but is driven using only the power of the continuous wave received through the antenna 110. Therefore, the recognition distance is limited to about 5 m, and recognition is unreliable when the tag is attached to a metal object.

Meanwhile, active and semi-active tags are battery-assisted, and thus have longer recognition distance than passive tags, but suffer from limited battery lifespan.

SUMMARY OF THE INVENTION

The present invention provides a low power battery-assisted radio frequency identification (RFID) tag having improved recognition distance, and a wake-up method thereof.

According to an aspect of the present invention, there is provided an RFID tag comprising: a power source that supplies a driving voltage; a continuous wave detector that receives the driving voltage from the power source so as to detect a continuous wave in a signal received from an RFID tag reader; a command detector that selectively receives the driving voltage and detects a command in the signal; and a controller that executes the command detected by the command detector by supplying the driving voltage to the command detector if the continuous wave is detected, and stops the driving voltage from being supplied to the command detector if no command is received from the command detector for a predetermined time period.

According to another aspect of the present invention, there is provided a wake-up method of an RFID tag, comprising: detecting a continuous signal in a signal received from an RFID tag reader by using internal power; detecting and executing a command in the signal by providing the internal power if the continuous wave is detected; and stopping the provided power if no command is detected for a predetermined time period.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms, and should not be construed as being limited to the embodiments set forth herein; rather, these embodiments are provided so that this disclosure will be thorough and complete, and will fully convey the concept of the invention to those skilled in the art.

Figure 1:
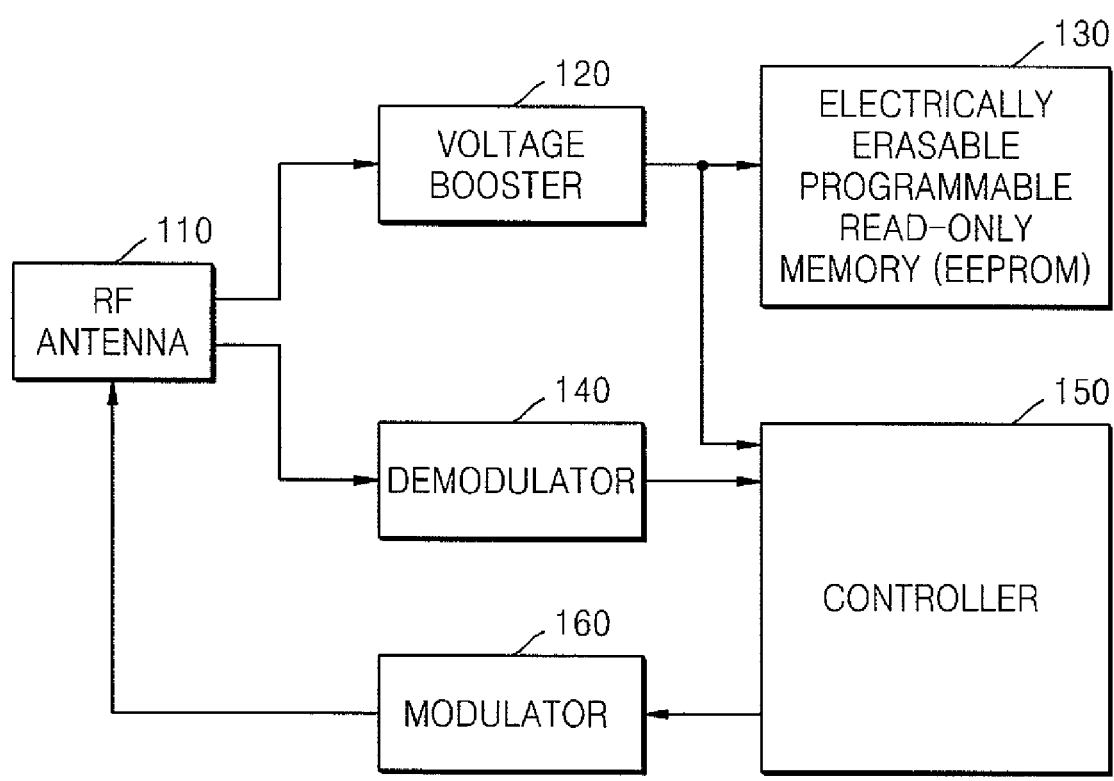
FIG. 1 is a functional block diagram of a conventional passive radio frequency identification (RFID) tag.
Figure 2:
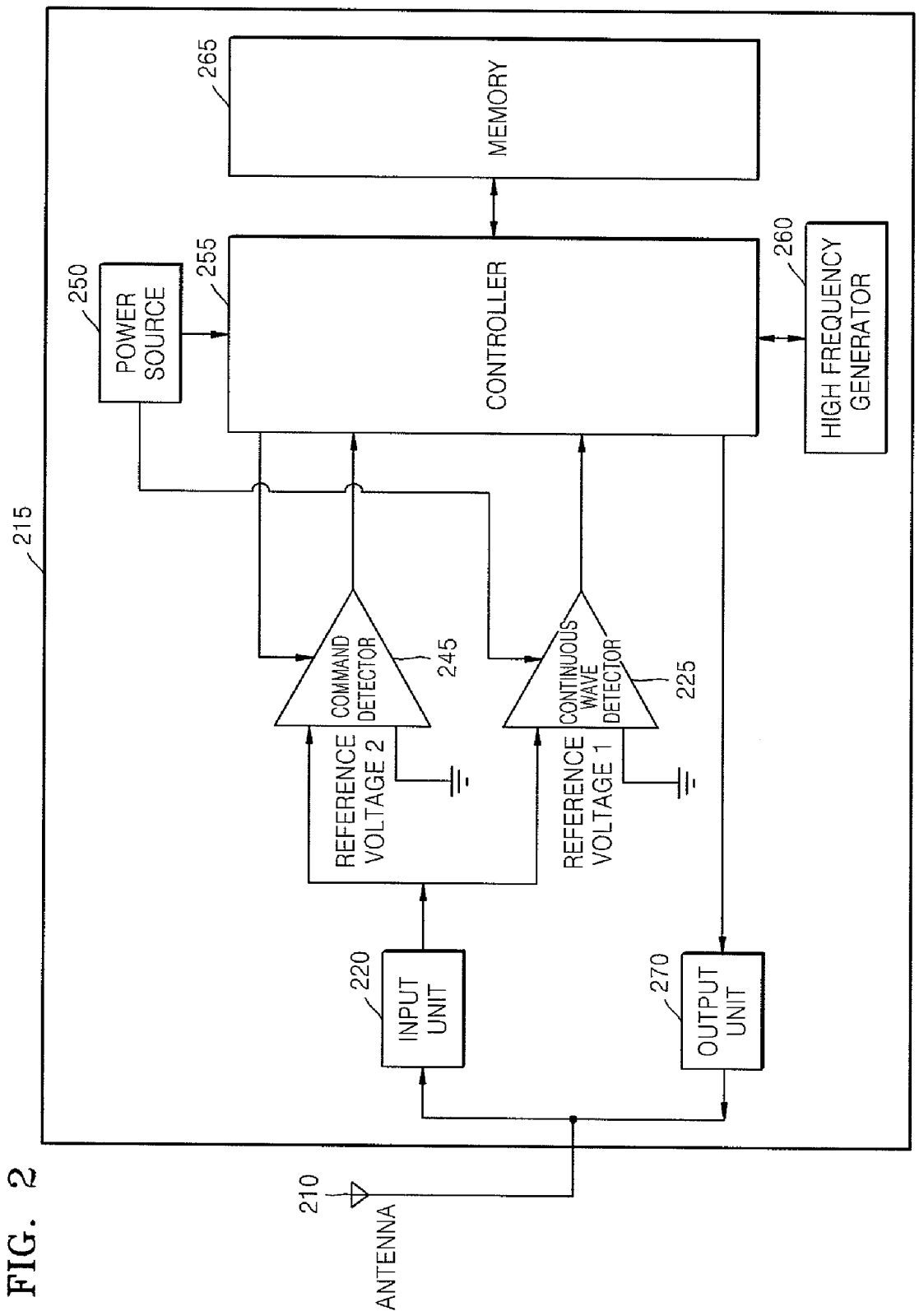
FIG. 2 is a functional block diagram of an RFID tag according to an embodiment of the present invention.

FIG. 2 is a functional block diagram of a radio frequency identification (RFID) tag according to an embodiment of the present invention.

Referring to FIG. 2, when a signal (including a continuous wave and a command) is received by an RFID tag 215 from an RFID tag reader, an input unit 220 rectifies and boosts the signal to output a direct-current voltage. A continuous wave detector 225 compares the direct-current voltage with a reference voltage to detect the continuous wave. Since this is an only example of a continuous wave detection method, another method may also be used, as long as it is well-known to those skilled in the art. In this case, the continuous wave detector 225 has a long propagation delay time. However, the continuous wave detector 225 is always driven by a minimum quiescent current supplied by a power supply 250 included in the RFID tag 215.

A controller 255 supplies a stable driving voltage to a command detector 245, a high frequency generator 260, and a memory 265. Furthermore, the controller 255 has an active mode, which executes a command detected in the signal received from the RFID tag reader, and a stand-by mode which does not provide the driving voltage. If the continuous wave is detected, the controller 255 changes from the stand-by mode, which is the initial mode, to the active mode, to supply the driving voltage to the command detector 245.

After receiving the driving voltage from the controller 255, the command detector 245 detects the command in the signal received from the RFID tag reader. The quiescent current consumed by the command detector 245 is greater than that of the continuous wave detector 225. However, since the controller 255 operates only when in the active mode, and its propagation delay time is shorter than that of the continuous wave detector 225, it is possible to distinguish all commands transmitted from the RFID tag reader. When in the active mode, the controller 255 executes the command detected by the command detector 245. In this case, the driving voltage is supplied to the high frequency generator 260 and the memory 265 so as to obtain an operation frequency and a memory operation which are required to execute the command. An output unit 270 outputs the result of executing the command, and an antenna 210 transmits the result to the RFID tag reader. If the command detector 245 detects no command for a predetermined time period, the controller 255 changes to the stand-by mode so that the driving voltage is not supplied to the command detector 245. That is, when the controller 255 is in the active mode, the RFID tag 215 receives the command from the RFID tag reader, and communication between the RFID tag 215 and the RFID tag reader which executes and outputs the command is readily carried out. When the controller 255 is in the stand-by mode, minimum power is consumed to detect the continuous wave.

Figure 3:
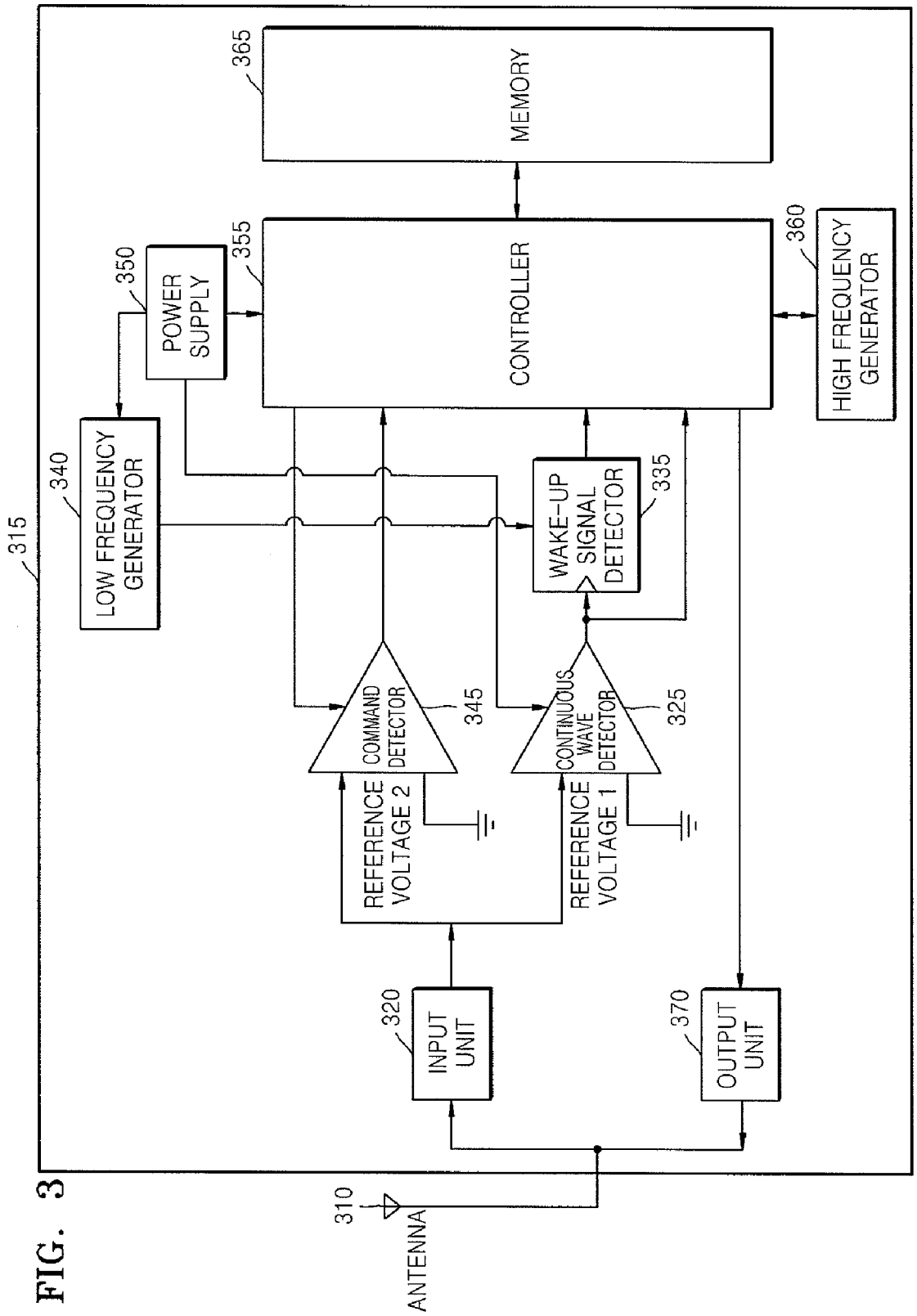
FIG. 3 is a functional block diagram of an RFID tag according to another embodiment of the present invention.

FIG. 3 is a functional block diagram of an RFID tag according to another embodiment of the present invention.

Referring to FIG. 3, when a signal (including a continuous wave, a command, and a wake-up signal) is received by an RFID tag 315 from an RFID tag reader, an input unit 320 rectifies and boosts the signal to output a direct-current voltage. A continuous wave detector 325 compares the direct-current voltage with a reference voltage to detect the continuous wave. Since this is an only example of a continuous wave detection method, another method may also be used, as long as it is well-known to those skilled in the art. In this case, the continuous wave detector 325 has a long propagation delay time. However, the continuous wave detector 325 is always driven by a minimum quiescent current supplied by a power supply 350 included in the RFID tag 315.

When in the active mode, a controller 355 supplies a stable driving voltage to a command detector 345, a high frequency generator 360, and a memory 365. Furthermore, the controller 355 executes a command detected in the signal received from the RFID tag reader. On the other hand, when in the passive mode, the driving voltage is not provided. If the continuous wave is detected, the controller 355 temporarily supplies the driving voltage to the continuous wave detector 325. After receiving the driving voltage, the continuous wave detector 325 transmits the signal received from the RFID tag reader to a wake-up signal detector 335. The wake-up signal detector 335 detects a wake-up signal in the signal. In this case, a low frequency generator 340 provides an operation frequency required to detect the wake-up signal. In order to detect the wake-up signal, the wake-up signal detector 335 may use a method in which the frequency of a signal is compared with the frequency of a known wake-up signal. In addition to this method, various other methods may be used as long as they are well-known to those skilled in the art.

If the wake-up signal is detected, the controller 355 changes from the stand-by mode, which is the initial mode, to the active mode, to supply the driving voltage to the command detector 345. After receiving the driving voltage from the controller 355, the command detector 345 detects the command in the signal received from the RFID tag reader. The quiescent current consumed by the command detector 345 is greater than that of the continuous wave detector 325. However, since the command detector 345 operates only when the controller 355 is in the active mode, and its propagation delay time is shorter than that of the continuous wave detector 325, it is possible to detect all commands transmitted from the RFID tag reader. When in the active mode, the controller 355 executes the command detected by the command detector 345. In this case, the driving voltage is supplied to the high frequency generator 360 and the memory 365 so as to obtain an operation frequency and a memory operation which are required to execute the command. An output unit 370 outputs the result of executing the command. An antenna 310 transmits the result to the RFID tag reader. If the command detector 345 detects no command for a predetermined time period, the controller 355 changes its mode to the stand-by mode so that the driving voltage is not supplied to the command detector 345. That is, when the controller 355 is in the active mode, the RFID tag 315 receives the command from the RFID tag reader, and communication between the RFID tag 315 and the RFID tag reader which executes and outputs the command is readily carried out. On the other hand, when the controller 355 is in the stand-by mode, the RFID tag 315 consumes minimum power to detect the continuous wave.

The structure of the embodiment of FIG. 3 is almost same as that of FIG. 2 except that the continuous wave and the wake-up signal both have to be detected in order for the controller 355 to change from the initial stand-by mode to the active mode.

Figure 4:
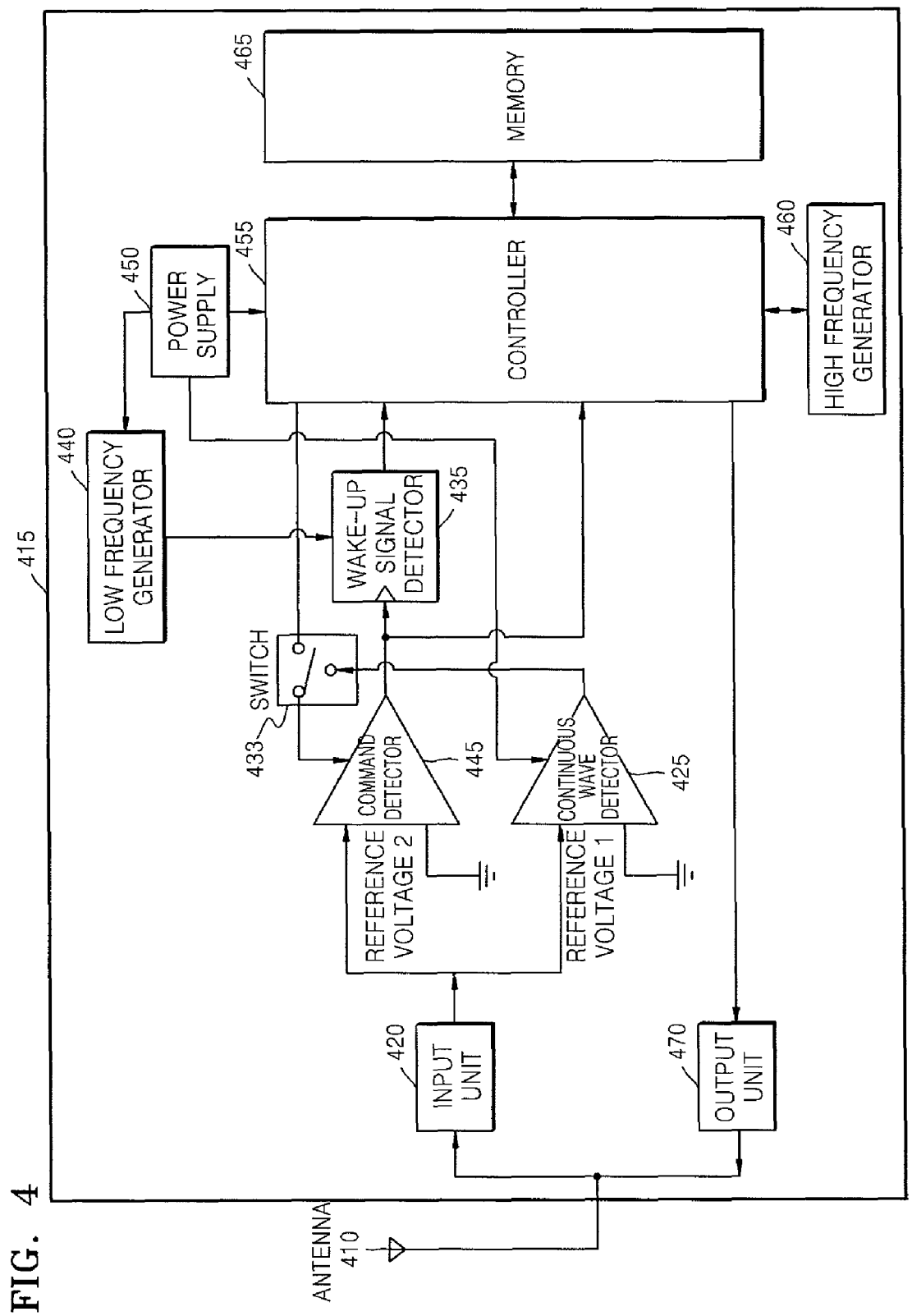
FIG. 4 is a functional block diagram of an RFID tag according to another embodiment of the present invention.

FIG. 4 is a functional block diagram of an RFID tag according to another embodiment of the present invention.

Referring to FIG. 4, when a signal (including a continuous wave, a command, and a wake-up signal) is received by an RFID tag 415 from an RFID tag reader, an input unit 420 rectifies and boosts the signal to output a direct-current voltage. A continuous wave detector 425 compares the direct-current voltage with a reference voltage to detect the continuous wave. Since this is an only example of a continuous wave detecting method, another method may also be used, as long as it is well-known to those skilled in the art. In this case, the continuous wave detector 425 has a long propagation delay time. However, the continuous wave detector 425 is always driven by a minimum quiescent current supplied by a power supply 450 included in the RFID tag 415.

If the continuous wave is detected, the continuous wave detector 425 temporarily supplies the driving voltage to a command detector 445 through a switch 433. After receiving the driving voltage, the command detector 445 transmits the signal received from the RFID tag reader to a wake-up signal detector 435. The wake-up signal detector 435 detects a wake-up signal in the signal. In this case, a low frequency generator 440 provides an operation frequency required to detect the wake-up signal. In order to detect the wake-up signal, the wake-up signal detector 435 may use a method in which the frequency of a signal is compared with the frequency of a known wake-up signal. In addition to this method, various other methods may be used as long as they are well-known to those skilled in the art.

When in the active mode, a controller 455 supplies a stable driving voltage to the command detector 445, a high frequency generator 460, and a memory 465. Furthermore, the controller 455 executes a command detected in the signal received from the RFID tag reader. On the other hand, when in the passive mode, the driving voltage is not provided. If the wake-up signal is detected, the controller 455 changes from the stand-by mode, that is the initial state, to the active mode, to supply the driving voltage to the command detector 445.

After receiving the driving voltage from the controller 455, the command detector 445 detects the command in the signal received from the RFID tag reader. The quiescent current consumed by the command detector 445 is greater than that of the continuous wave detector 425. However, since the command detector 445 operates only when the controller 455 is in the active mode, and its propagation delay time is shorter than that of the continuous wave detector 425, it is possible to detect all commands transmitted from the RFID tag reader. When in the active mode, the controller 455 executes the command detected by the command detector 445. In this case, the driving voltage is supplied to the high frequency generator 460 and the memory 465 so as to obtain an operation frequency and a memory operation which are required to execute the command.

An output unit 470 outputs the result of executing the command, and an antenna 410 transmits the result to the RFID tag reader. If the command detector 445 detects no command for a predetermined time period, the controller 455 changes its mode to the stand-by mode so that the driving voltage is not supplied to the command detector 445. That is, when the controller 455 is in the active mode, the RFID tag 415 receives the command from the RFID tag reader, and communication between the RFID tag 415 and the RFID tag reader which executes and outputs the command is readily carried out. On the other hand, when the controller 455 is in the stand-by mode, the RFID tag 415 consumes minimum power to detect the continuous wave.

Comparing the embodiment of FIG. 4 with that of FIG. 3, in FIG. 3, if the continuous wave is detected, the continuous wave detector 325 receives the signal received from the RFID tag reader and transmits the signal to the wake-up signal detector 335. On the other hand, in FIG. 4, if the continuous wave is detected, the continuous wave detector 425 temporarily supplies the driving voltage to the command detector 445 so that the activated command detector 445 receives the signal to be transmitted to the wake-up signal detector 435.

In FIGS. 2 through 4, the sensor which detects environment information can be used with the memory 265, 365 or 465 for the controller 255, 355, and 455 to use the information.

Figure 5:
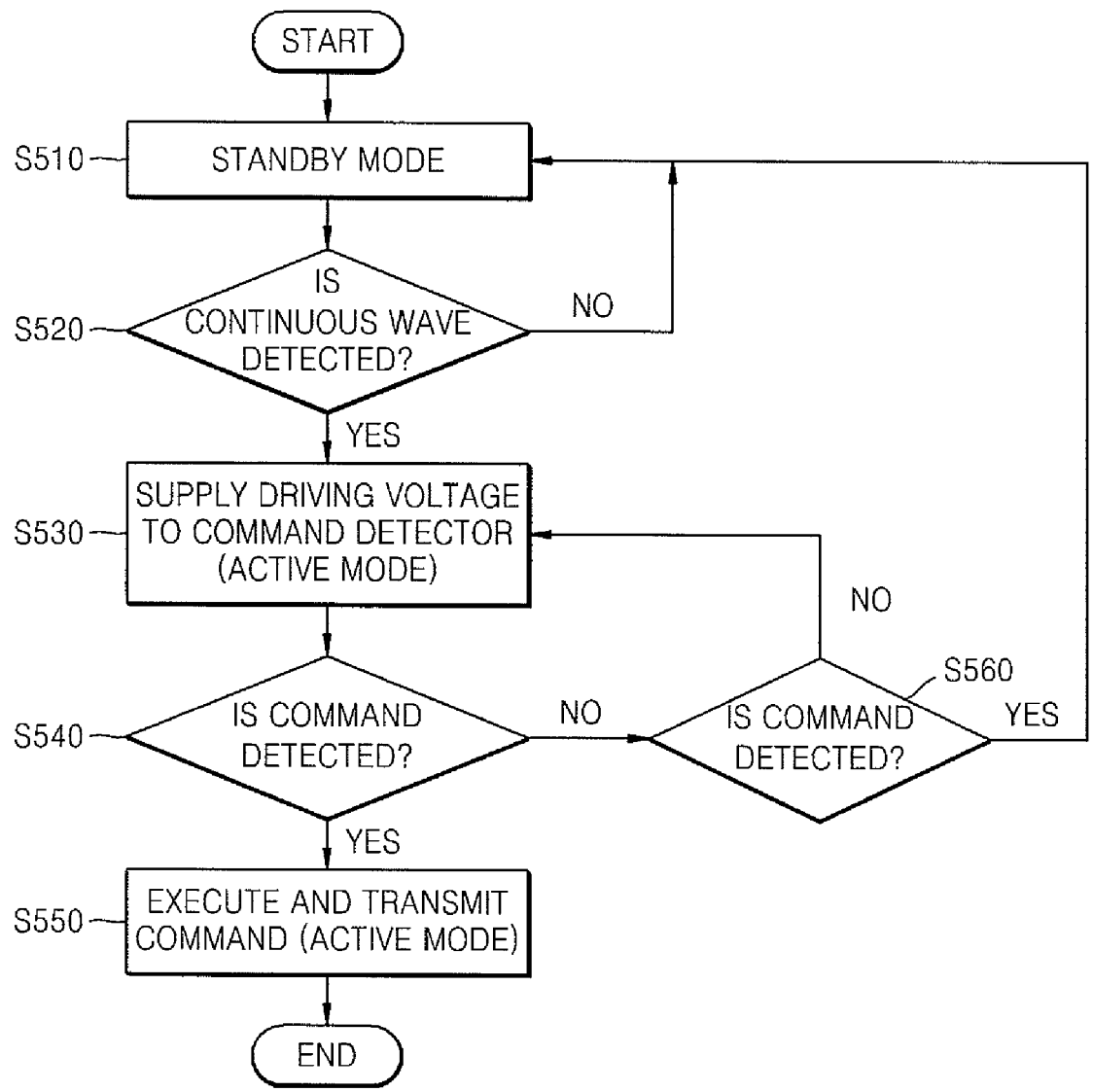
FIG. 5 is a flowchart illustrating a wake-up method of an RFID tag according to an embodiment of the present invention.

FIG. 5 is a flowchart illustrating a wake-up method of an RFID tag according to an embodiment of the present invention.

Referring to FIGS. 2 and 5, the controller 255 is initially in the stand-by mode (operation S510). The continuous wave detector 225 is always driven with a minimum driving current by the internal power source 250. Therefore, the continuous wave detector 225 detects the continuous wave in the signal received from the RFID tag reader even when in the standby mode (operation S520). If the continuous wave is detected, the controller 255 changes its mode to the active mode and then supplies the driving voltage to the command detector 245 (operation S530). After receiving the driving voltage, the command detector 245 detects a command in the signal received from the RFID tag reader (operation S540). The controller 255 executes the command and transmits the execution result to the RFID tag reader (operation S550).

If no continuous wave is detected when in the stand-by mode, the controller 255 remains in the stand-by mode (operation S510). Furthermore, if the command detector 245 detects no command for more than a predetermined time period when in the active mode (operation S560), the controller 255 stops the driving voltage from being supplied to the command detector 245 and changes its mode to the stand-by mode (operation S510).

Figure 6:
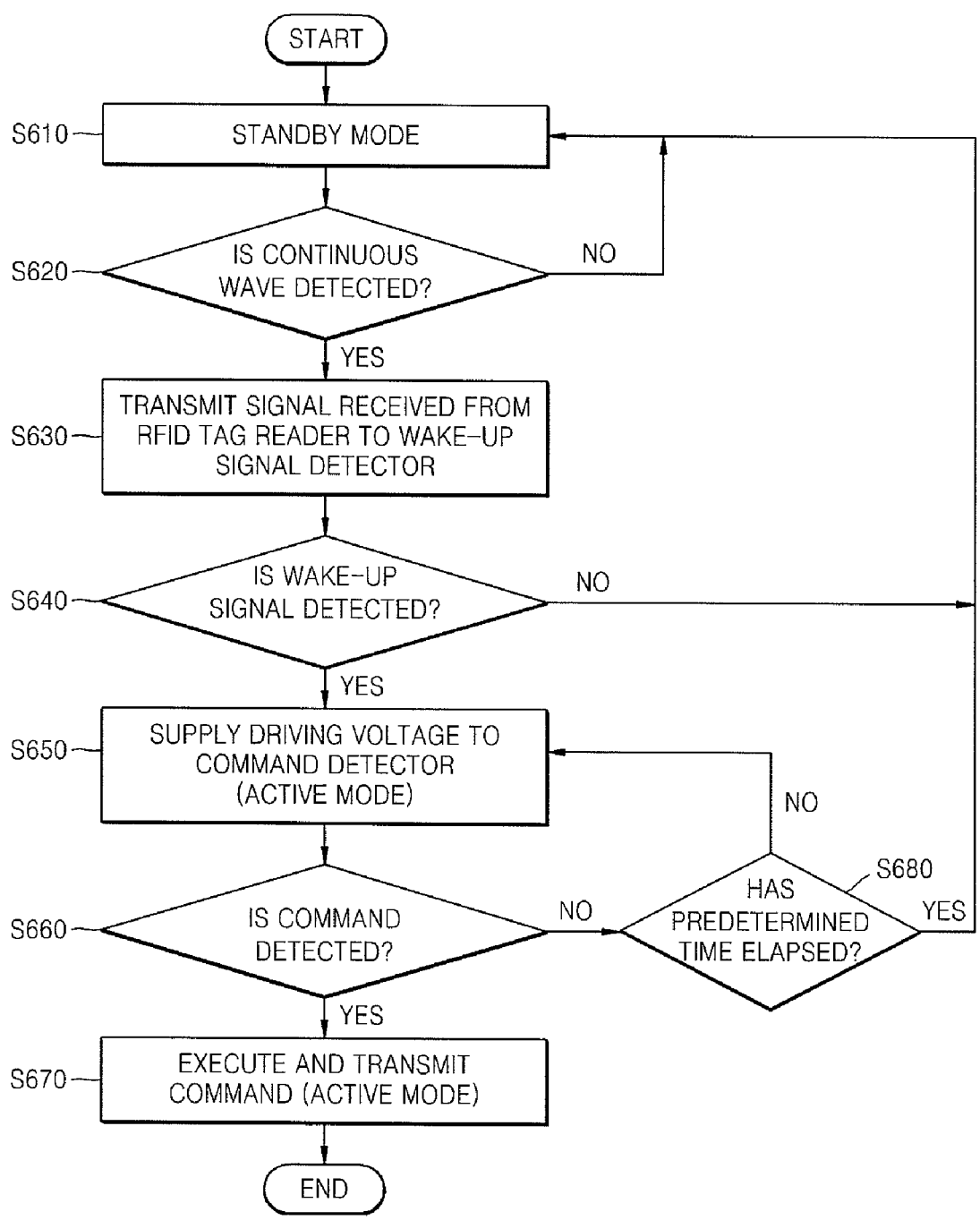
FIG. 6 is a flowchart illustrating a wake-up method of an RFID tag according to another embodiment of the present invention.

FIG. 6 is a flowchart illustrating a wake-up method of an RFID tag according to another embodiment of the present invention.

Referring to FIGS. 3, 4, and 6, the controller 355 is initially in the stand-by mode (operation S610). The continuous wave detector 325 is always driven with a minimum driving current by the internal power source 350. Therefore, the continuous wave detector 325 detects the continuous wave in the signal received from the RFID tag reader even when in the standby mode (operation S620). If the continuous wave is detected, the signal received from the RFID tag reader is transmitted to the wake-up signal detector 335 (operation S630).

Operation S630 for transmitting the signal received from the RFID tag reader to the wake-up signal detector 335 will be described in detail. In FIG. 3, the operation for transmitting the signal received from the RFID tag reader to the wake-up signal detector 335 is performed by the continuous wave detector 325. On the other hand, in FIG. 4, operation S630 includes an operation in which the continuous wave detector 425 temporarily supplies the driving voltage to the command detector 445 through the switch 433, and an operation in which the command detector 445 receives the driving voltage and transmits the signal received from the RFID tag reader to the wake-up signal detector 435.

After receiving the signal received from the RFID tag reader, the wake-up signal detector 335 detects a wake-up signal (operation S640). If the wake-up signal is detected, the controller 355 changes its mode to the active mode and supplies the driving voltage to the command detector 345 (operation S650). After receiving the driving voltage, the command detector 345 detects a command in the signal received from the RFID tag reader (operation S660). The controller 355 executes the command and transmits the execution result to the RFID tag reader (operation S670).

If no continuous wave or wake-up signal is detected, the controller 355 remains in the stand-by mode (operation S610). Furthermore, if the command detector 335 detects no command for more than a predetermined time period when in the active mode, the controller 355 stops the driving voltage from being supplied to the command detector 345 and changes its mode to the stand-by mode (operation S610).

In comparison with FIG. 5, operation 630 is further included, in which the signal received from the RFID tag reader is transmitted to the wake-up signal detector 335 so as to detect a wake-up signal. That is, in FIG. 5, the stand-by mode is changed to the active mode when only the continuous wave is detected, whereas in FIG. 6, the stand-by mode is changed to the active mode when both the continuous wave and the wake-up signal are detected.

According to the present invention, a continuous wave detector is always driven with a minimum quiescent current by an internal power source so as to detect a continuous wave, thereby improving the recognition distance of the radio frequency identification (RFID) tag. In addition, since a command is detected by receiving a driving voltage only when the continuous wave is detected, it is possible to reduce power consumption.

What is claimed is:

1. An RFID (radio frequency identification) tag comprising:
   a power source that supplies a driving voltage;
   a continuous wave detector that receives the driving voltage from the power source so as to detect a continuous wave in a signal received from an RFID tag reader;
   a command detector that selectively receives the driving voltage and detects a command in the signal;
   a switch that temporarily provides the driving voltage from the continuous wave detector to the command detector to detect the command in the signal if the continuous wave is detected;
   a wake-up signal detector that detects a wake-up signal in a signal at the output of the command detector if the continuous wave is detected and the command detector temporarily received the driving voltage and receives the signal, wherein a controller supplies a stable driving voltage through the switch to the command detector so as to execute the command detected by the command detector if the continuous wave and the wake-up signal are detected;
   wherein the controller executes the command detected by the command detector by supplying the stable driving voltage to the command detector through the switch if the continuous wave is detected, and stops the stable driving voltage from being supplied to the command detector if no command is received from the command detector for a predetermined time period; and
   wherein the switch is external to the controller.

2. The RFID tag of claim 1, further comprising a high frequency generator that selectively receives the driving voltage and supplies an operation frequency of a high frequency to the controller, wherein the controller supplies the driving voltage to the high frequency generator if the continuous wave is detected, and operates in synchronization with the operation frequency.

3. The RFID tag of claim 1, further comprising a memory, wherein the controller supplies the driving voltage to the memory if the continuous wave is detected.

4. An RFID (radio frequency identification) tag comprising:
   a power source that supplies a driving voltage;
   a continuous wave detector that receives the driving voltage from the power source so as to detect a continuous wave in a signal received from an RFID tag reader, and outputs a direct-current voltage if the continuous wave is detected;
   a switch that temporarily provides the driving voltage from the continuous wave detector to a command detector that receives the command signal when the driving voltage is selectively provided through the switch if the continuous wave is detected;
   a wake-up signal detector that detects a wake-up signal in the signal at the output of the command detector;
   a controller supplies a stable driving voltage through the switch to the command detector so as to execute the command detected by the command detector if the continuous wave and the wake-up signal are detected;
   wherein, the controller executes the command detected by the command detector by supplying a stable driving voltage to the command detector through the switch if the wake-up signal is detected, and stops the driving voltage from being supplied to the command detector if no command is received from the command detector for a predetermined time period; and
   wherein the switch is external to the controller.

5. The RFID tag of claim 4, further comprising a high frequency generator that selectively receives the driving voltage and supplies an operation frequency of a high frequency to the controller, wherein the controller supplies the driving voltage to the high frequency generator if the wake-up signal is detected, and operates in synchronization with the operation frequency.

6. The RFID tag of claim 5, further comprising a memory, wherein the controller supplies the driving voltage to the memory if the wake-up signal is detected.

7. The RFID tag of claim 3 or 6, further comprising a sensor that detects environment information when the power source provides driving power, and stores in the memory a result obtained by converting the environment information into an electrical signal.

8. The RFID tag of claim 4, further comprising a low frequency generator that supplies an operation frequency of a low frequency to the wake-up signal detector, wherein the wake-up signal detector operates in synchronization with the operation frequency.

9. The RFID tag of claim 8, wherein the low frequency generator is an RTC (real time clock).

10. The RFID tag of claim 1 or 4, further comprising an input unit that rectifies and boosts the signal received from the RFID tag reader so as to output a direct-current voltage, wherein the continuous wave detector detects the continuous wave by comparing the direct-current voltage output from the input unit with a reference voltage.

11. The RFID tag of claim 1 or 4, further comprising an antenna that receives the signal from the RFID tag reader and outputs the signal to the RFID tag.

12. The RFID tag of claim 1 or 4, further comprising an output unit that outputs the result of executing the command.

13. The RFID tag of claim 12, wherein the output unit is an active type which operates using power provided from the power source.

14. The RFID tag of claim 12, wherein the output unit is a passive type which obtains power from a continuous wave included in the signal.

15. A wake-up method of an RFID (radio frequency identification) tag, comprising:
   detecting a continuous signal in a signal received from an RFID tag reader by using a driving voltage of an internal power;
   detecting a command in the signal when a temporarily driving voltage is selectively provided from a continuous wave detector to a command detector through a switch external to a controller if the continuous wave is detected and detecting a wake-up signal in the signal at the output of the command detector;
   executing the command in the signal by providing a stable driving voltage through the switch to the command detector from the internal power if the continuous wave is detected; and
   stopping the provided the stable voltage if no command is detected for a predetermined time period.

16. The wake-up method of claim 15, comprises:
   outputting a direct-current voltage to temporarily provide the direct-current voltage if the continuous wave is detected;
   receiving the signal powered by the direct-current voltage; and
   detecting the wake-up signal in the received signal.

17. The wake-up method of claim 15, further comprising receiving a signal from the RFID tag reader to output the signal to the RFID tag.

18. The wake-up method of claim 15, comprises:
generating a direct-current voltage by rectifying and boosting the signal received from the RFID tag reader; and
detecting a continuous wave by comparing the direct-current reference voltage using the internal power.

19. The wake-up method of claim 15, further comprising outputting the result of executing the command.

20. The wake-up method of claim 15, further comprising supplying the power to a memory and an internal device if the continuous wave is detected.

* * * * *